(12) United States Patent
Kuenen

(10) Patent No.: US 6,745,671 B2
(45) Date of Patent: Jun. 8, 2004

(54) CONVEYOR BELT SYSTEM AND OVEN

(75) Inventor: Hendrikus Antonius Jacobus Kuenen, Overloon (NL)

(73) Assignee: Koppens B.V., Bakel (NL)

( * ) Notice: Subject to any disclaimer, the term of this patent is extended or adjusted under 35 U.S.C. 154(b) by 0 days.

(21) Appl. No.: 09/724,996

(22) Filed: Nov. 29, 2000

(65) Prior Publication Data

US 2001/0004862 A1 Jun. 28, 2001

(30) Foreign Application Priority Data

Dec. 6, 1999 (NL) .............................................. 1013768

(51) Int. Cl.[7] .................................................. B65G 15/16
(52) U.S. Cl. ............................. 99/349; 99/404; 99/407; 99/443 C; 198/626.4; 198/861.1
(58) Field of Search ....................... 99/349, 405, 443 C, 99/402, 404, 407; 426/438, 523; 198/626.3, 626.4, 861.1

(56) References Cited

U.S. PATENT DOCUMENTS

| | | | |
|---|---|---|---|
| 1,760,979 A | * 6/1930 | Ferry | |
| 3,309,981 A | 3/1967 | Benson | 99/405 |
| 3,340,792 A | * 9/1967 | Matzke | 99/405 |
| 4,357,862 A | 11/1982 | Anstett et al. | 99/355 |
| 4,729,296 A | * 3/1988 | Sabin | 99/349 |
| 5,458,051 A | * 10/1995 | Alden et al. | 99/349 |
| 5,549,040 A | * 8/1996 | Naramura | 99/349 |

* cited by examiner

*Primary Examiner*—Drew Becker
(74) *Attorney, Agent, or Firm*—Young & Thompson

(57) ABSTRACT

A conveyor belt system for transporting products through a bath of liquid, such as heated cooking oil in an oven, comprises a feed belt accommodated in a base frame and a top belt, located above the feed belt and accommodated in an auxiliary frame, for transporting the products through the bath of liquid between the top belt and the feed belt, as well an adjustable support mechanism for adjusting the distance between feed belt and top belt, which support mechanism comprises further adjustable supports by means of which the auxiliary frame is supported on the base frame. All supports are mechanically coupled to one another by coupling means for common adjustment thereof.

2 Claims, 6 Drawing Sheets

Fig 14
Fig 15
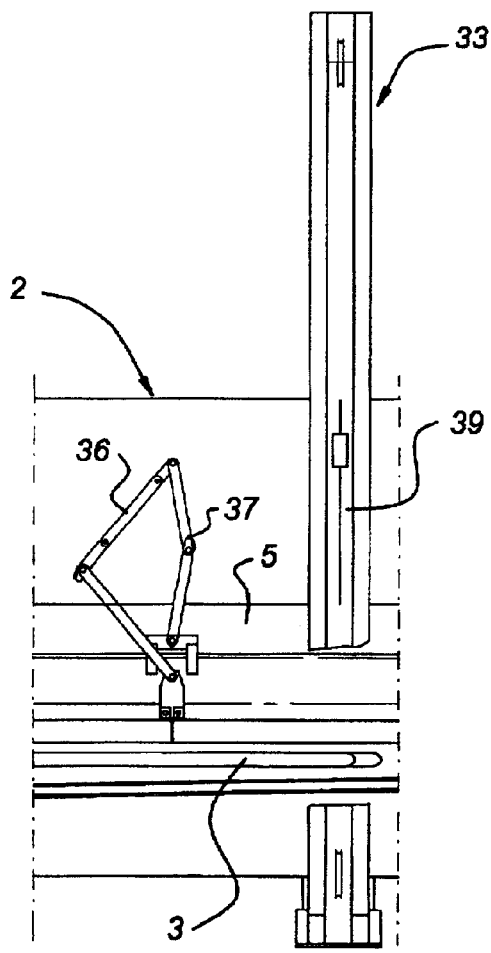
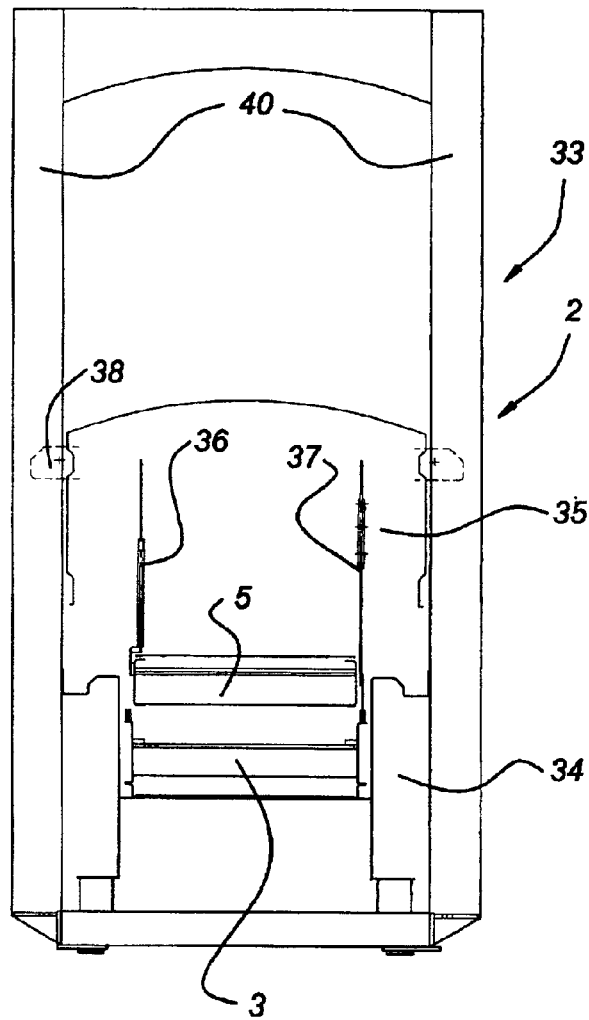

CONVEYOR BELT SYSTEM AND OVEN

FIELD OF THE INVENTION

The invention relates to a conveyor belt system for transporting products through a bath of liquid, such as heated cooking oil in an oven or hot water in a boiler, comprising a feed belt, accommodated in a base frame, and a top belt, located above the feed belt and accommodated in an auxiliary frame, for transporting the products through the bath of liquid between the feed belt and the top belt, as well an adjustable support mechanism for adjusting the distance between feed belt and top belt, which support mechanism comprises further adjustable supports by means of which the auxiliary frame is supported on the base frame.

BACKGROUND OF THE INVENTION

Conveyor belt systems of this type are known. They are used, for example, in ovens. The products, for example meat products such as hamburgers, chicken fillets, schnitzels or potato products and the like, move on the feed belt through the heated oil. Depending on the speed of the feed belt, they remain in the oil for a certain time in order to obtain the desired degree of cooking, browning and the like.

Some products are able to float in the oil and consequently no longer remain on the feed belt. As a consequence of this the residence time in the oil can no longer be controlled with the desired accuracy. However, by virtue of the top belt even such products can be fed through the oil in the desired, controlled manner. To this end, the top belt holds the products on the feed belt.

Since different types of products have different thicknesses, it must be possible to adjust the distance between the top belt and the feed belt. The support mechanisms must be adjusted for this purpose, which in practice is a time-consuming, high risk operation. First of all each support mechanism must be adjusted individually. Since there are usually 4 to 6 such support mechanisms, adjustment takes a great deal of time. Moreover, the adjustment mechanisms are located immediately alongside the bath containing hot oil. Therefore, the cover first has to be raised for adjustment. Adjustment then has to be carried out in the oil fumes being given off, which is unpleasant and can be dangerous.

The aim of the invention is to provide a conveyor belt system that does not have these disadvantages and can be operated more easily.

SUMMARY OF THE INVENTION

Said aim is achieved in that the supports are mechanically coupled to one another by coupling means for common adjustment thereof, for example by a central control element.

By mechanically coupling the supports, these can be operated simultaneously from one common control point. Rapid adjustment of the top belt is possible as a result.

The adjustable supports can be constructed in various ways, for example using a screw adjustment. However, the preference is for a construction where each support comprises a ramp mechanism, which ramp mechanisms are connected to one another by means of a pull element to provide relative movements in each ramp mechanism, which movements are associated with adjustment movements transverse to the base frame and auxiliary frame.

The ramp mechanisms may or may not be self-locking. The desired adjustment is always possible by means of the pull element; in the case of self-locking mechanisms a pull element is used that is able to exert a tensile force in two opposing directions.

Each ramp mechanism can comprise a ramp support and a block which can be moved with respect to one another, one of which is fixed with respect to one of the frames and the other is movably attached to a frame in order to provide adjustment movements.

Preferably at least two ramp mechanisms are provided on each longitudinal side of the frames, such that the slope of the ramp mechanisms on one longitudinal side is opposite to the slope of the ramp mechanisms on the other longitudinal side, which ramp mechanisms are connected to one another by a pull element that changes direction close to at least one transverse side of the frames.

There is then a winder close to the other transverse side of the frames, the pull element being a flexible cable or the like, the ends of which are each wound in the opposite direction on the winder.

According to a simple, stable embodiment, each ramp support is fixed to the base frame and each block is movably attached to the auxiliary frame.

With regard to the introduction of the products into the bath of liquid it can be desirable to position the first portion of the feed belt and the auxiliary belt at a certain slope. To this end the base frame and the auxiliary frame can each consist of a main frame component and a lead-in frame component hingeably connected thereto, the hinge pins of which are parallel to one another some distance apart, which lead-in frame components are mutually supported by at least two ramp mechanisms which are located on the two longitudinal sides thereof and are rigidly joined to one of the lead-in frame components and can be moved with respect to the other lead-in frame component.

In order in this embodiment also to be able to support the lead-in frame component of the auxiliary frame in the correct, adjustable manner, each ramp support of the lead-in frame components is fixed to, in each case, one of said components by means of a bearer which can be moved transversely with respect to said lead-in frame component and bears on the other lead-in frame component, and the associated block is movably attached to that lead-in frame component to which the bearer is also attached.

Preferably, the winder is accommodated on the main frame component to which the blocks are movably attached and the bearers are attached to the lead-in frame component associated with said main frame component, which lead-in frame component has deflection pulleys around which the cable changes direction.

The invention also relates to an oven comprising a conveyor belt system as described above, a tank to hold a quantity of cooking oil and a cover for covering the tank, the conveyor belt system being located in said tank.

According to the invention the drive for the coupling means can be located outside the tank or cover. It is now no longer necessary to lift the cover in order to adjust the auxiliary belt. This adjustment can therefore be carried out safely and rapidly.

Such an oven can be provided in the conventional manner with a lifting device for lifting the cover and the conveyor belt system relative to the tank. Recourse can be made to this lifting device should the adjustment forces become too high when adjusting the supports.

The invention therefore also relates to a method for operating such an oven in relation to adjustment of the distance between the feed belt and the top belt, comprising the following steps:

increasing the distance between the feed belt and the top belt by means of the lifting device, adjusting the supports in order to obtain a new support position related to the new, desired distance between the feed belt and the top belt, transferring the support of the top belt on the feed belt to the supports.

BRIEF DESCRIPTION OF THE DRAWINGS

The invention will be explained in more detail below with reference to the illustrative embodiment shown in the figures.

FIGS. 14 and 15 show the lifting device.

DETAILED DESCRIPTION OF THE INVENTION

Figure 1:
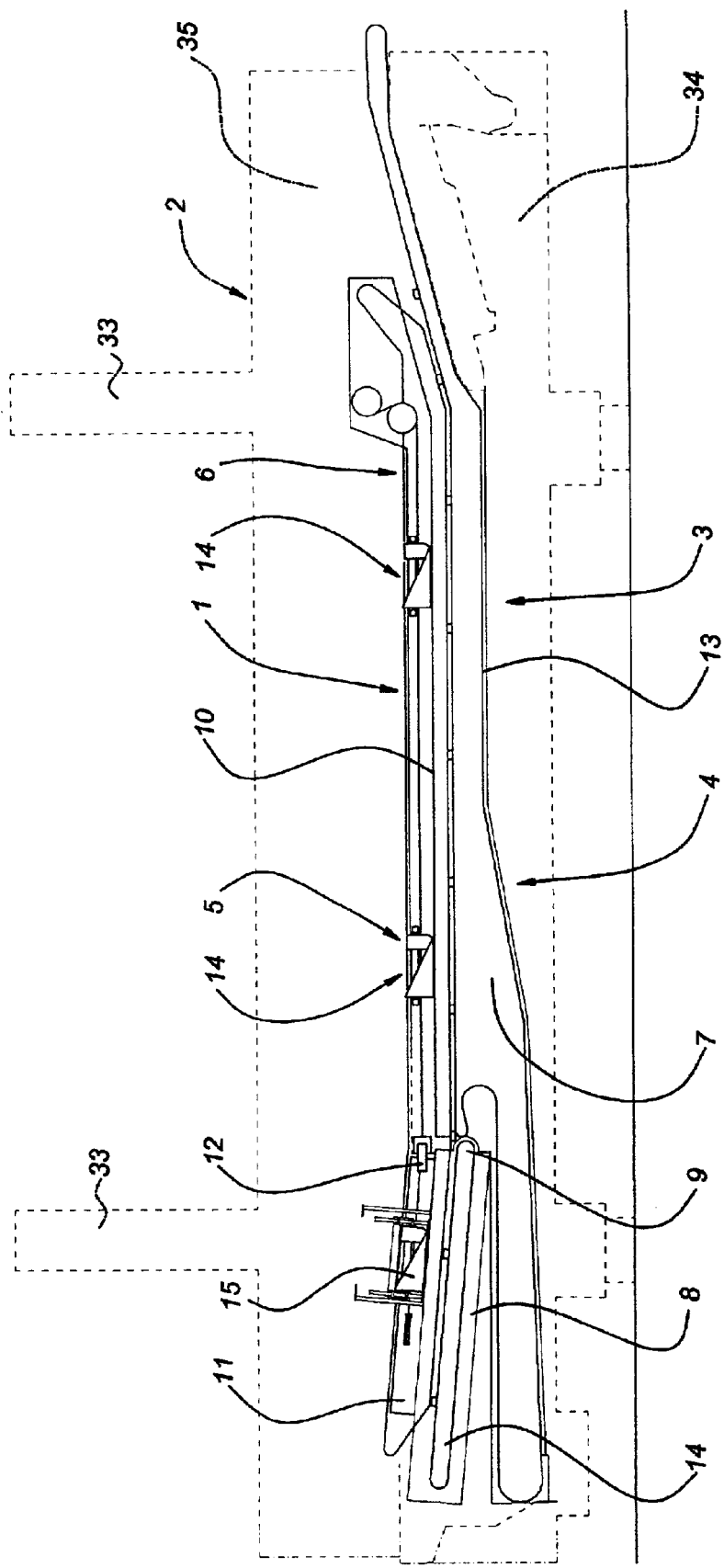
FIG. 1 shows a side view of the conveyor belt system according to the invention.

The conveyor belt system 1 is shown by continuous lines in FIG. 1. This conveyor belt system 1 is intended for an oven 2, the outlines of the tank 34, the cover 35 and the lifting devices 33 of which are shown by dash-and-dot lines. The conveyor belt mechanism 1 comprises a feed belt 3 that is accommodated in a base frame 4. The conveyor belt system further comprises a top belt 5 that is accommodated in an auxiliary frame 6.

The base frame 4 comprises a main frame 7 as well as a lead-in frame 8 that can be adjusted to various angles of inclination about a hinge 9.

The auxiliary frame 6 also consists of a main frame 10 and an auxiliary frame 11 that likewise can be pivotably adjusted to various angles of inclination about hinge 12.

In the embodiment shown the top belt runs continuously from the main frame 10 to the auxiliary frame 11. The feed belt 3, however, consists of two separate parts, that is to say the main feed belt 13, which is accommodated in the main frame 7, and the lead-in feed belt 14, that is accommodated in the lead-in frame 8.

The auxiliary frame 6, and thus the top belt 5, can be adjusted to various heights above the base frame 4, and thus above the feed belt 3, by means of the adjustable ramp mechanisms 14, 15.

As shown in FIGS. 3–6, each ramp mechanism 14 has a ramp support 16 that is fixed to the base frame 4, in particular the top flange 17 thereof.

In addition each ramp mechanism 14 has a block 18 that can be moved over the ramp support 16. To this end block 18 and ramp support 16 have corresponding sloping surfaces 19, 20.

Figure 6:
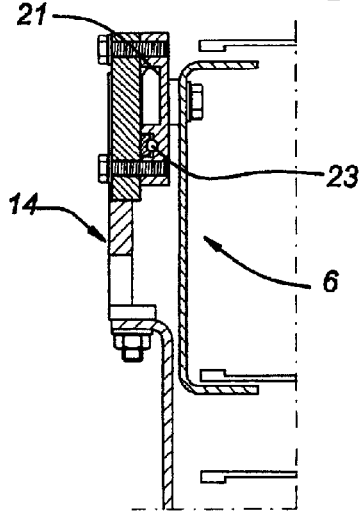
FIG. 6 shows a section along VI—VI in FIG. 4.

As shown in FIG. 6, the block has a cavity 21 into which the T-shaped section 22, which is fixed to the auxiliary frame 6, projects.

A cable 23 is fixed to the blocks 18, the two ends of which cable 23 are wound around the winder 24 in opposing directions, each via a deflection pulley 25. The winder 24 is connected to the handles 27 by means of a chain transmission 26.

Figure 7:
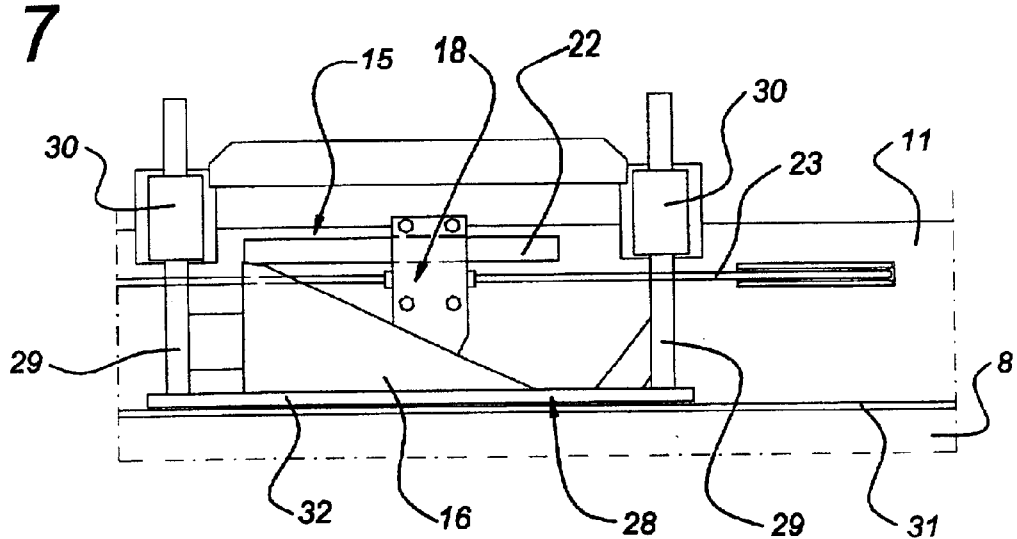
FIG. 7 shows a further ramp mechanism.
Figure 8:
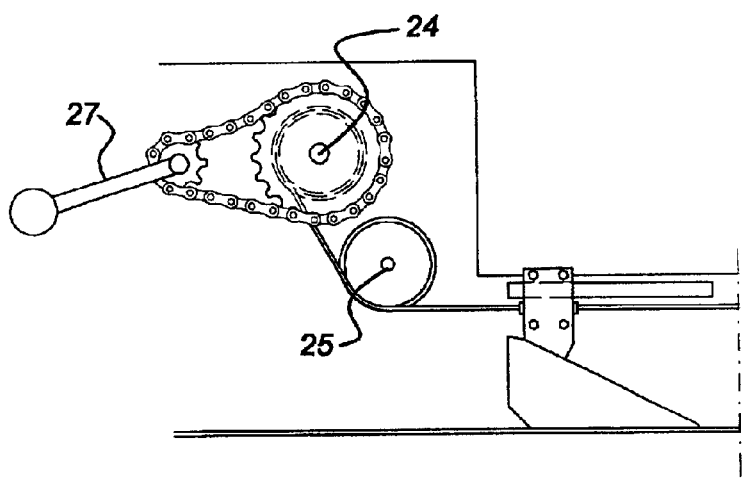
FIGS. 8 and 9 show views of the operating mechanism.
Figure 9:
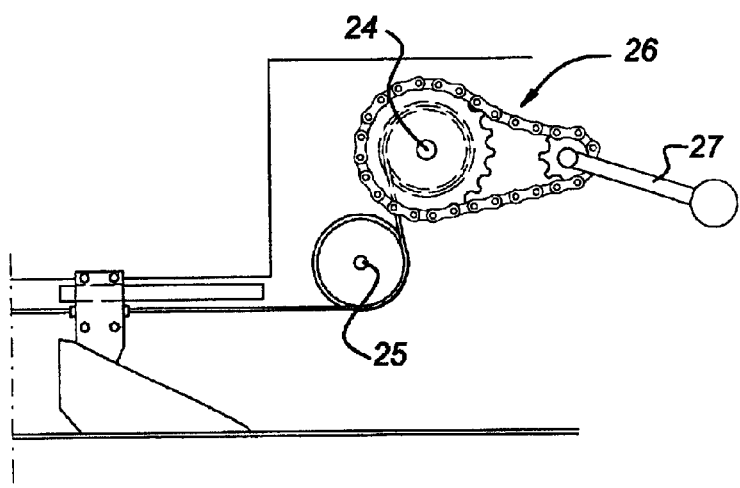

The ramp mechanisms 15 which are installed between the lead-in frame components 8, 11 differ somewhat from the ramp mechanisms between the main frame components 7, 10. As shown in FIG. 7, in the case of the ramp mechanism 15 both ramp support 16 and the block 18 are fixed to the auxiliary frame 6, in particular the lead-in frame component 11 thereof. The ramp support 16 is seated on a bearer 28 that, by means of rods 29, is slideably accommodated in the guides 30. The bearer 28 has a bearer plate 32, fixed to the rods 29, onto which the ramp support 16 has been welded and which bears on the flange 31 of the lead-in frame component 8 of the base frame 4.

When setting the angle of the lead-in frame components 8 about their respective hinge pins 9, 12, the baseplate 32 is able to move to some extent along the flange 31 of the lead-in frame component 8, such that, on the one hand, the desired setting of the lead-in frame components 8, 11 with respect to one another is possible and, on the other hand, the hingeing movement about the non-coincident hinge pins 9, 12 remains possible.

Figure 10:
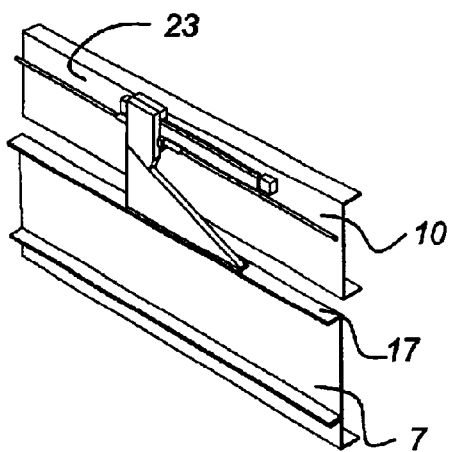
FIGS. 10 and 11 show various positions of the main frame components.
Figure 11:
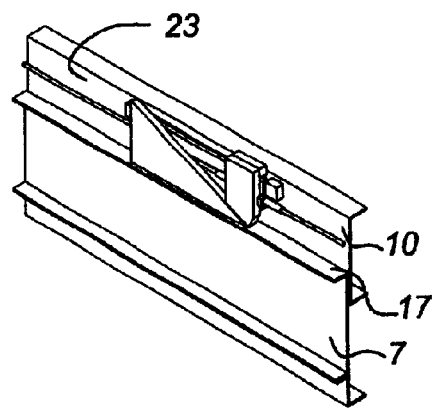

FIGS. 10 and 11 show, respectively, the high and the low position of the main frame components 7, 10 of the base frame 4 and the auxiliary frame 6, respectively.

Figure 12:
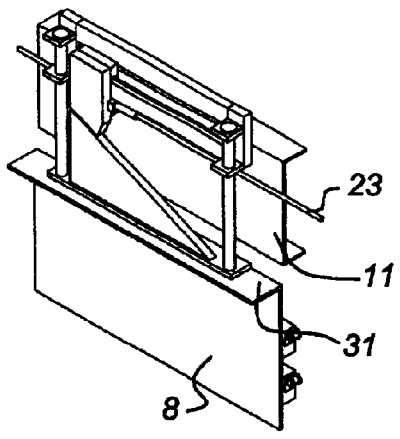
FIGS. 12 and 13 shows various positions of the lead-in frame components.
Figure 13:
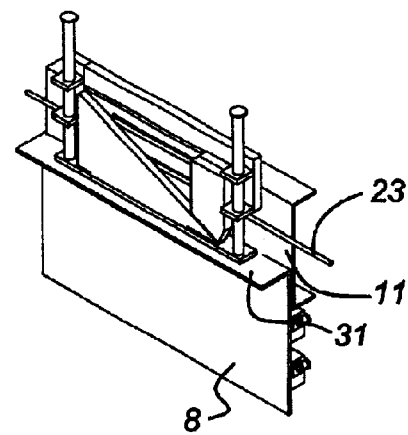

FIGS. 12 and 13 show, respectively, the high and the low position of the lead-in frame components 8, 11.

Figure 2:
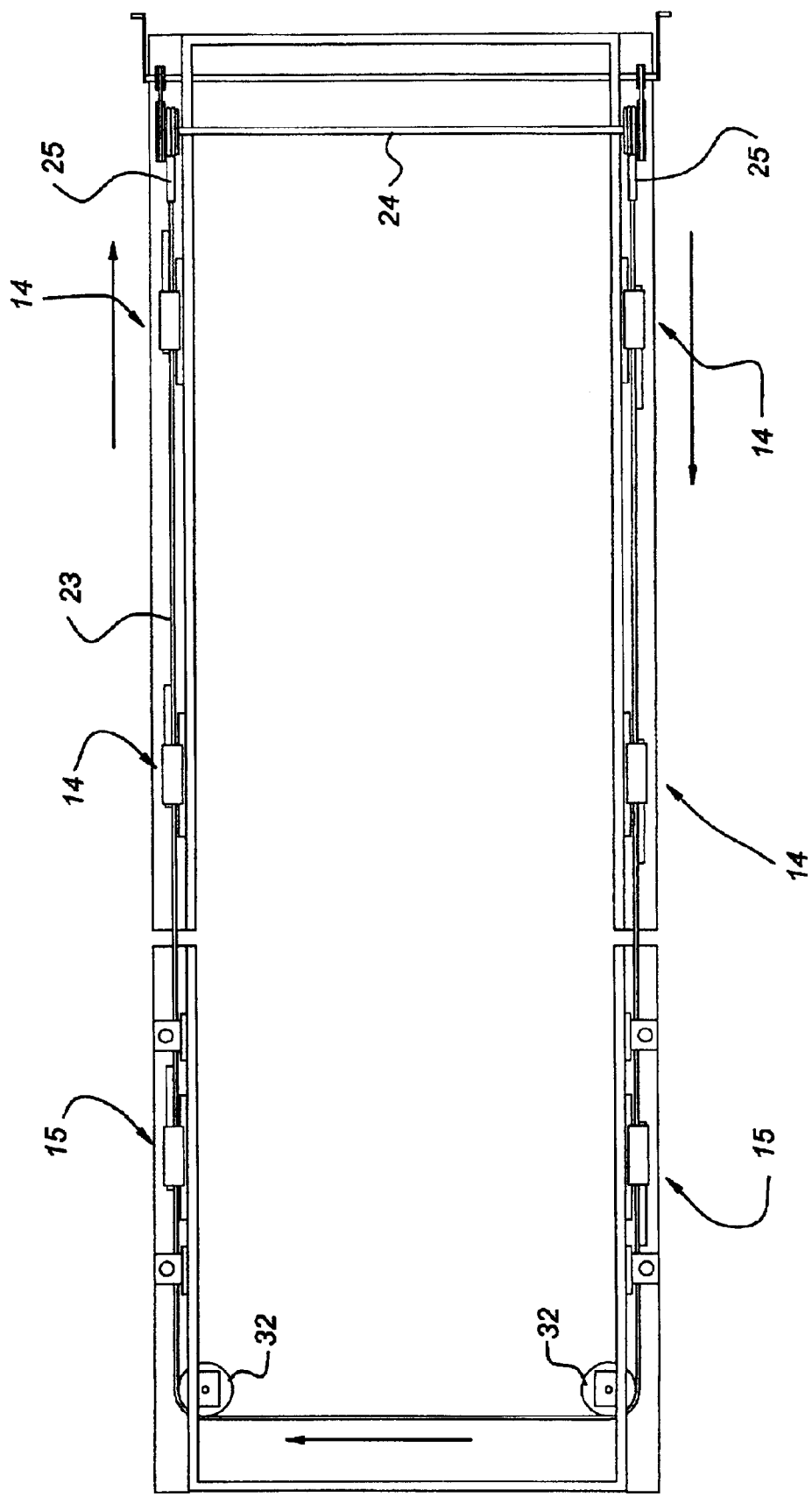
FIG. 2 shows a partial plan view.
Figure 3:
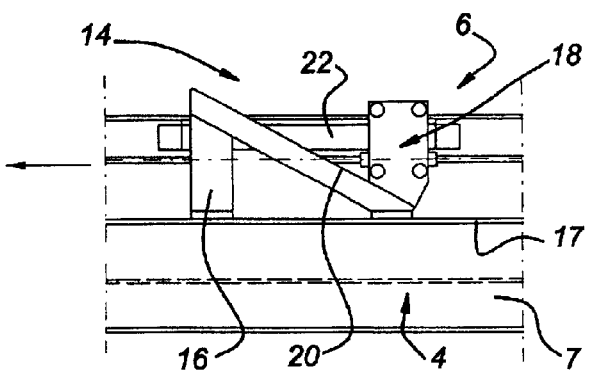
FIGS. 3–5 show steps in the adjustment of a ramp mechanism.
Figure 4:
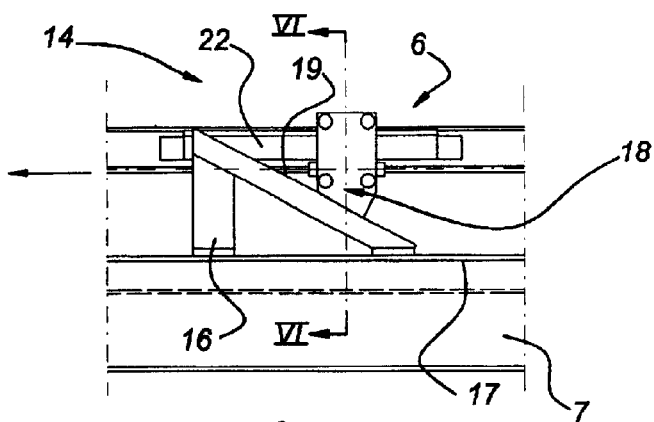
Figure 5:
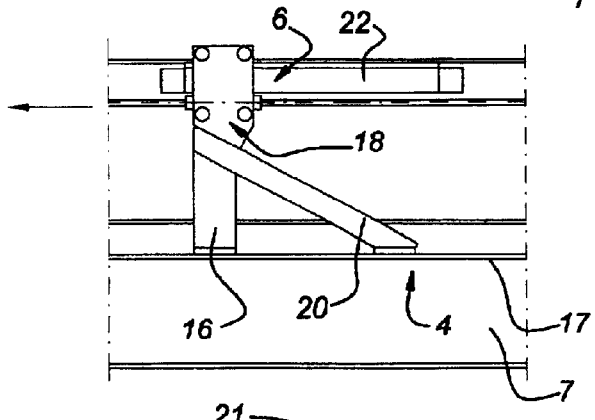

FIG. 2 shows the path of the cable 23, from the winder 24 via the deflection pulleys 25, the ramp mechanisms 14, 15 and deflection pulleys 32.

As already mentioned, the oven 2 according to the invention has lifting devices 33, which, as is customary, are intended for successively lifting the cover 35, then the top belt 5 by means of the scissor mechanism 37 and then the feed belt 3 by means of the scissor mechanism 36. These scissor mechanisms 36, 37 are mounted in a known manner on the cover 35, which in turn can be moved up and down in the legs 40 of the lifting device 33 by means of flanges 38 and a cable drive 39 known per se.

According to the invention use can also be made of this lifting device 33 when adjusting the top belt 5 relative to the feed belt 3. Specifically, should the frictional forces in the supports 14, 15, and in particular between the ramp supports 16 and the blocks 18, become too high, the following procedure can be followed.

First of all the lifting device 33 is operated such that the top belt 5 is lifted relative to the feed belt 3. During this operation the blocks 18 leave the ramp supports 16. The blocks 18 are then moved into a desired position with respect to the ramp supports 16, which desired position corresponds to the distance between feed belt 3 and top belt 5, which eventually has to be obtained.

This position can be so chosen that the blocks 18 are just in contact with the ramp supports 16, such that after cutting the power to the lifting devices 33 the top belt 5 immediately has the correct position relative to the feed belt 3.

As an alternative the blocks 18 can be moved relative to the ramp supports 16 such that they are not yet in contact with one another. The feed belt 5 is then moved downwards by the lifting devices 33, the blocks 18 coming into contact with the ramp supports 16 and the desired distance between feed belt 3 and top belt 5 being obtained.

What is claimed is:

1. A conveyor belt system for transporting products through a bath of liquid in an oven, comprising a feed belt accommodated in a base frame, a top belt located above the feed belt and accommodated in an auxiliary frame for transporting products through the bath of liquid between the top belt and the feed belt, and an adjustable support mechanism for adjusting the distance between the feed belt and the top belt, said support mechanism comprising at least two ramp mechanisms provided on each longitudinal side of the frames, the slope of the ramp mechanisms on one longitudinal side of the frames being opposite the slope of the ramp mechanisms on the other longitudinal side of the frames, a flexible pull element that extends about both longitudinal sides of the frames and is connected to the ramp mechanisms, and means to pull said pull elements selectively in opposite directions whereby lengths of said flexible pull element on opposite sides of said frames will move in opposite directions to provide relative movements of the ramp mechanisms and to change the distance between the belts.

2. A conveyor belt system as claimed in claim 1, wherein said pull element comprises a flexible cable and said means to pull said pull element comprises a winder on which ends of said flexible cable are wound in opposite directions, whereby when said winder is rotated in one direction, lengths of said flexible cable on opposite sides of said frames will move in opposite directions.

* * * * *